March 29, 1938.  J. JUNKUNC  2,112,243
CAN SEALING MACHINE
Filed Dec. 23, 1936  3 Sheets-Sheet 1
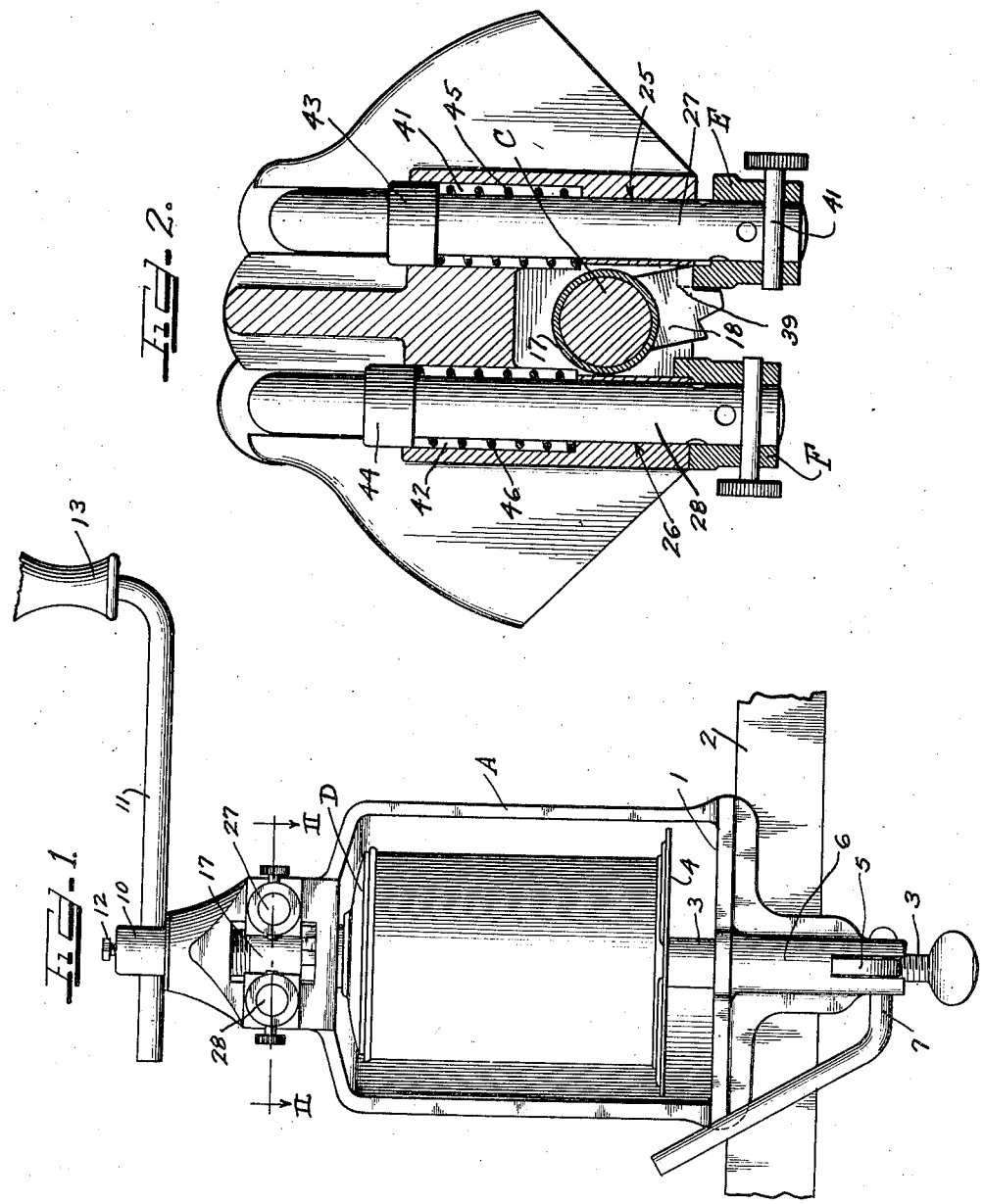
Inventor
John Junkunc.
by Charles Hill Attys.

March 29, 1938. J. JUNKUNC 2,112,243
CAN SEALING MACHINE
Filed Dec. 23, 1936   3 Sheets-Sheet 2
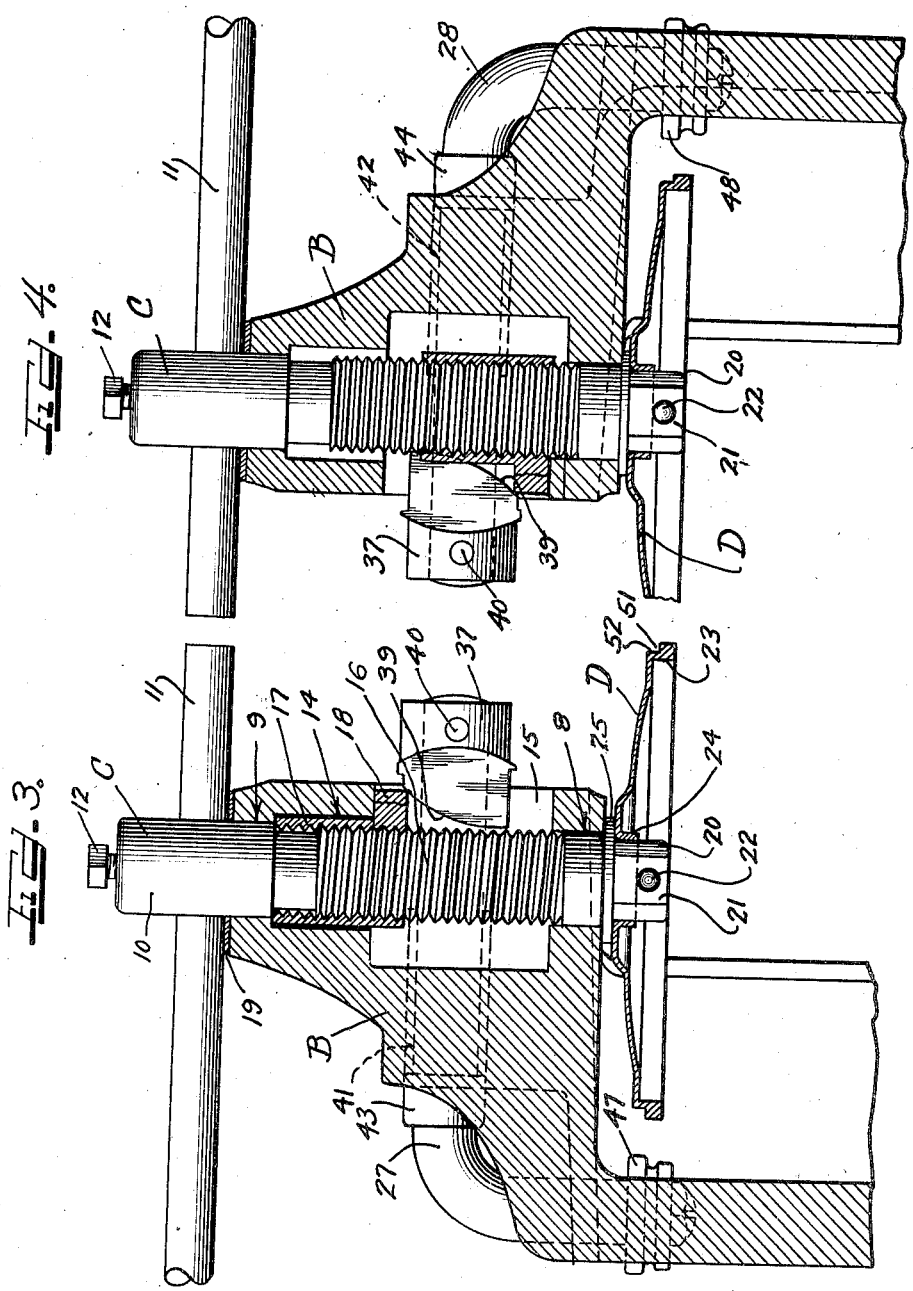
Inventor
John Junkunc.
by Charles Neff
Attys.

March 29, 1938. J. JUNKUNC 2,112,243
CAN SEALING MACHINE
Filed Dec. 23, 1936 3 Sheets-Sheet 3
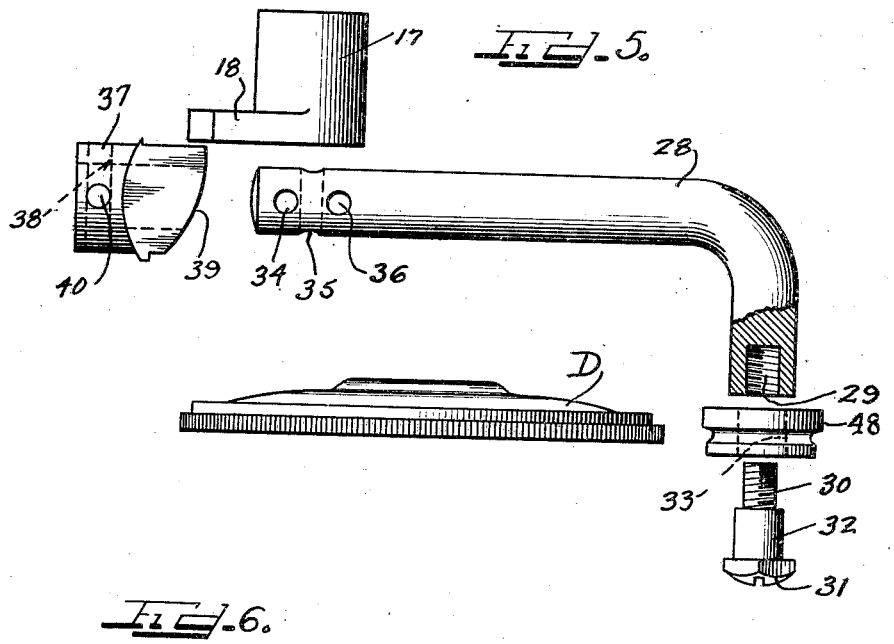
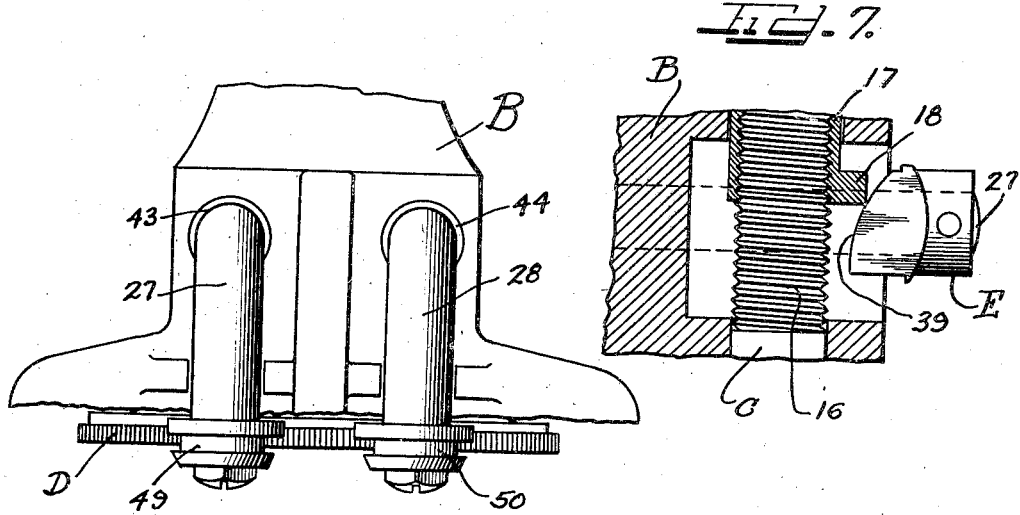
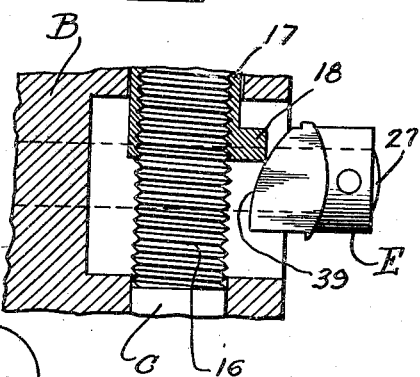
Inventor
John Junkunc.
by Charles Hill Attys.

Patented Mar. 29, 1938

2,112,243

UNITED STATES PATENT OFFICE 2,112,243

CAN SEALING MACHINE

John Junkunc, Chicago, Ill.

Application December 23, 1936, Serial No. 117,293

14 Claims. (Cl. 113—23)

The present invention relates to can sealing machine and more particularly to a machine wherein the rollers are automatically moved against a supported can and cover by means operable by rotation of the driving chuck plate and spindle.

Hand operated can sealing machines are in use today, which are so constructed as to require the use of both hands of an operator for working the machine. One hand of the operator is used to rotate the driving chuck plate and the other hand is used to manipulate the seaming rollers to carry out the seaming operations. It has been found from experience that while such machines are effective for seaming cans, yet when an operator such as a housewife is engaged in canning a large amount of food products, she quickly tires with the result that oftentimes she uses insufficient strength or lacks sufficient strength to press the seaming rollers against the can tops with enough pressure to form air tight seals.

The machine of the present invention overcomes the above mentioned objections by automatically actuating the seaming rollers from the chuck rotating means so that it is necessary for the operator to use but one hand for effectually sealing cans with air tight seams.

An object of the present invention is to provide a hand operated can sealing machine wherein the rollers are actuated automatically by rotation of the driving chuck spindle.

Another object of the present invention is to provide a hand operated can sealing machine having a plurality of seaming rollers which are alternately moved automatically into can sealing relation with respect to the driving chuck by mechanism operated when the chuck is rotated.

A further object of the present invention is to provide a hand operated can sealing machine wherein one roller is moved into operative relation by rotation of the chuck in one direction and the other roller is moved into operative relation by rotation of the chuck in the opposite direction.

A still further object of the present invention is to provide a hand operated can sealing machine wherein the rollers are alternately and automatically moved into operative relation with the driving chuck by mechanism operable by rotation of the chuck.

The invention has for a further object the provision of a hand operated can sealing machine wherein seaming rollers or cutting rollers may be utilized for seaming or opening cans, wherein a supported can may be rotated and the rollers alternately moved into operative relation simply by rotation of the driving chuck spindle.

Another and further object of the present invention is to provide a novel driving chuck formed from sheet metal.

The above other and further objects of the present invention will be apparent from the following description and accompanying drawings:

The accompanying drawings illustrate an embodiment of the present invention and the views thereof are as follows:

Figure 1 is an elevational view of the can sealing machine of the present invention, with a can in position and with the cover seamed in place.

Figure 2 is an enlarged horizontal sectional view taken substantially in the plane indicated by line II—II of Figure 1 showing one of the movable bars in normal or inoperative position and the other bar moved part way of its path of travel and showing relationship of certain of the operative parts of the present invention.

Figure 3 is an enlarged vertical sectional view taken through the axis of the driving chuck spindle and showing one of the reciprocating bars in normal or inoperative position, showing other parts in section, with the relationship of the actuating nut and one cam as the same appear at the beginning of the stroke wherein a bar is moved toward the driving chuck.

Figure 4 is a view similar to Figure 3 showing the other bar with the operating nut at the beginning of stroke directed to move this bar inwardly toward the driving chuck.

Figure 5 is a view, partially in elevation and partially in section of an exploded view showing a bar, its cam, the actuating nut, driving chuck and a roller separated from the bar together with means for securing the roller to the bar.

Figure 6 is a fragmental elevational view looking at the roller end of the machine and showing cutter rollers substituted for the seaming rollers.

Figure 7 is an enlarged fragmental vertical sectional view showing the relationship of the parts corresponding to the partially retracted position of the right-hand bar of Figure 2.

The drawings will now be explained:

Figure 1 is an elevational view of the illustrated form of the present invention, with a can and cover in position, with the cover seamed and sealed to the can body and showing the machine clamped to a shelf.

The illustrated form of machine comprises a frame, designated A, preferably formed as a casting having a bottom 1 adapted to rest on a shelf or other suitable support 2 with an integral portion of the casting projecting downwardly from the bottom 1 to carry a thumb nut 3 for attaching the machine to a shelf, ledge, or the like, as is usual practice.

Vertically movable through the bottom 1 of the machine is a spindle 3 carrying a follower 4 which is rotatably mounted on the spindle 3. The spindle is adapted to be elevated or lowered by means of a cam 5 suitably pivoted in the portion 6 of the frame which extends downwardly from the bottom 1, and which cam is manipulated by means of a handle 7 suitably pivoted in the portion 6 and connected to the cam.

The follower 4 is provided with abutments or corrugations to center cans of different diameters on it.

The frame A of the machine includes an overhanging head piece B having vertical aligned bores 8 and 9 which receive a driving spindle C, vertically supported in the head. The spindle C has an upper end portion 10 with a horizontally disposed aperture through it for receiving one end of a crank 11. The crank is secured in the end 10 of the spindle by means of a set screw 12 threaded into the end of the spindle. The outer end of the crank 11 is preferably upturned and receives a suitable handle 13 which may be grasped for rotating the spindle C to drive the chuck plate D.

Immediately below the bore 9 in the head B is an enlarged bore 14 and below this the head is recessed at 15.

The spindle C between the portions 8 and 9 is threaded as at 16, for a portion of the length of the spindle. Surrounding the threaded portion 16 of the spindle is an elongated nut 17 having an outstanding lug 18 on it, which lug extends into the recess 15 of the head. The bore 14 is adapted to house the nut 17 when the same is moved upwardly to its limit of travel in upward direction as will be hereinafter more fully explained.

The spindle C is retained in position by means of the crank 11 bearing against a washer 19 interposed between the crank and the upper extremity of the head.

The lower end of the spindle C is provided with an end 20, in the present instance having a flat surface 21, with a spring pressed ball 22 carried in a recess formed in the end, the ball working through the flat surface 21 of the spindle end.

The chuck plate D is formed from sheet metal and so fashioned as to provide a peripheral portion 23 of greater axial dimension than the thickness of the metal from which the plate is made. This peripheral portion may be formed by forging or pressing or in any other suitable manner.

The chuck plate D is offset or dished with respect to its peripheral portion 23 and centrally thereof is formed with an inturned flange 24 which defines an aperture conforming in contour to the shape of the end 20 of the spindle. That is to say the aperture defined by the flange 24 conforms to the outline of the end 20 including the flattened portion 21, so that when the chuck plate is applied to this end of the spindle the plate will be carried by the spindle in relatively non-rotative manner. The flange 24 is of sufficient axial length to afford substantial bearing between it and the end 20 of the spindle. The spring pressed ball 22 is so disposed as to snap underneath the margin of the flange 24 when the chuck plate D is applied to the spindle and thus secure the plate against accidental removal.

Between the chuck plate D and the lower surface of the overhanging head B of the frame, a washer 75 is interposed to reduce friction.

Preferably the outer surface of the peripheral portion 23 of the chuck is corrugated or otherwise roughened for the purpose of positively driving a can top applied to the plate.

The head B is also provided with two horizontally disposed parallel openings 25 and 26, in which are reciprocable bars 27 and 28 respectively. The outer ends of the bars are bent at right-angles downwardly with the ends of the downwardly bent portions bored and threaded at 29 to receive the threaded ends 30 of bearing bolts 31 which bolts have enlarged cylindrical portions 32 to enter central bores 33 of the rollers 47, 48, 49 and 50.

Each of the bars at the opposite ends is provided with a plurality of axially spaced holes 34, 35, and 36 as may be observed in Figure 5.

Surrounding the other ends of the bars are cam members E and F. The details of one of the cam members are clearly shown in Figures 2 and 5.

Each cam member comprises a body portion 37 having an internal bore 38 adapted to pass over a bar. In addition, each cam member has a portion defining a curved cam face 39, which is vertical when applied to a bar. The cylindrical portions 37 of the cam members are apertured at 40 to receive pins 41 for connecting the cam members to the other ends, herein occasionally referred to as the inner ends of the bars, with the pins passing through any one of the holes 34, 35 or 36, as the size of can being sealed or opened, may require.

When a number 1 can is being sealed or opened, the cans are applied to the bars with the pins 41 passing through the holes 36 of the bars. When the machine is set up for sealing or opening number 2 or 2½ cans, the pins 42 are applied through the holes 35, and when set up for number 3 cans pass through the holes 34. In this fashion the cam members may be adjusted along the length of the bars 27 and 28 so as to regulate the range of movement of the bars for the sealing or opening operations.

As may be observed in Figures 3 and 4, the cam members 37 are so designed that the cam applied to the bar 27 will have the cam face 39 so positioned that the starting or zero point will be adjacent the upper end of the cam surface, whereas the cam member applied to the bar 28 will be so positioned and shaped that the initial or zero position will be adjacent the lower end of the cam face 39.

The bores 25 and 26 communicate with enlarged bores 41 and 42 respectively opening toward the outer ends of the bars. The bars are equipped with collars 43 and 44 respectively which ride in the bores 41 and 42. Between the collars and the inner ends of the bores, springs 45 and 46 encircle the bars 27 and 28 respectively, which springs function to normally urge the bars to outward position, that is, upwardly as viewed in Figure 2.

The collars 43 and 44 may be formed integrally with the bars or may be formed separately and secured to the bars in any appropriate manner. The bars 27 and 28 are arranged on opposite sides of the spindle C and move horizontally in their bores.

The rollers shown in Figures 3 and 4 are seaming rollers, the roller 47 being the first seaming roller and the roller 48 the second seaming roller. The rollers 47 and 48 or either of them may be removed to receive cutting rollers 49 and 50 (Figure 6) when it is desired to open cans by the machine of the present invention. The rollers may be interchanged by releasing the several pivot bolts 31 and substituting seaming or cutting rollers as the case may be.

The bolts 31 are so constructed as to align the several rollers with respect to the peripheral margin 23 of the driving chuck D to carry out the necessary seaming operations or to sever the upper end of a can should occasion arise.

The operation of the machine of the present invention is as follows:

When a housewife or other operator desires to can a quantity of food products, she provides herself with a sufficient number of cans and covers and then equips the machine with a driving chuck plate D of proper diameter to interfit with the covers of the particular size cans she may be using. At the same time the cam members 37 are so adjusted on the bars 27 and 28 to cause movement of the bars in accordance with the diameters of the cans being sealed. When the machine has been so adjusted, a filled can is placed on the follower 4 in lowered position, a cover is then placed on the can and the handle 7 actuated to elevate the can and cover which forces the depression in the cover over the periphery of the driving chuck D in tight relationship. The spindle C has previously been so rotated as to elevate the nut 17 to its uppermost position which is that shown in Figure 3. This movement is accomplished by rotating the spindle C in clockwise direction as viewed in Figure 2. The machine is now ready for carrying out the first seaming operation.

In order to carry out the first seaming operation, the spindle C is now rotated in counterclockwise direction as viewed in Figure 2, which first of all swings the lug 18 of the nut into engagement with the cam surface 39 of the cam member E on bar 27. Continued rotation of the spindle in this direction will lower the nut, consequently the lug 18 will move the cam to the right as viewed in Figure 3 or downwardly as viewed in Figure 2, thus moving the roller 47, carried by the bar 27 toward the driving disc C for carrying out the first seaming operation. When the lug 18 of the nut 17 reaches its lowermost position, the bar 27 has then been moved to its limit of travel in direction toward or against the chuck D.

The second seaming operation is carried out by reversing the rotation of the spindle C which first of all swings the lug 18 of the nut against the cam surface 39 of the cam member F on the bar 28, which engages the cam surface 39 at its lower point as may be observed in Figure 4. As soon as the lug 18 is moved out of contact with the cam E on the bar 27, the spring 45 returns the bar to its outermost or normal position, the spring having been compressed during inward movement of the bar.

Continued rotation of the spindle C elevates the nut which elevation moves the bar 28 inwardly to bring the second seaming roller 48 into seaming relation with the can top to complete the seaming operation.

When the second seaming operation has been completed, the can is removed by lowering the handle 7 and dropping the follower 4 so that the sealed can may then be removed from the driving chuck plate D, and a new can applied to the follower and the operation repeated.

When it is desired to open a sealed can, one or both of the rollers 47 and 48 may be replaced by cutting rollers 49 and/or 50 and the machine manipulated in the same manner as it is manipulated to carry out the seaming operations. Such operation will move first of all one cutting roller against the can and if desired, the second cutting roller, although it has been found that but a single cutting roller need be used.

The parts are so constructed that during the time either of the bars is moved to its limit of movement in can seaming direction the driving chuck plate D has been given several rotations so that there is no question but what a can top is securely sealed to the can body in air tight relationship.

The construction of the driving chuck plate D in the manner described provides a chuck plate which is sufficiently strong for the purposes intended and the provision of the inturned flange 24 serves a sufficient bearing against the end 20 of the spindle to prevent rocking of the chuck plate during the seaming operation.

The outer portion of the periphery 23 of the driving chuck plate D is fashioned with a rabbet 51, the inner axial surface 52 of which may serve as a stop for the registering portion of the roller in the event that there is any tendency to move the roller beyond its limit of movement as ordinarily determined by the position of the cam member on the particular bar carrying the roller in question. That is to say, the provision of the rabbet 51 affords stop means on the clutch to limit inward movement of the seaming rollers, which stop is in addition to that afforded by the relationship of the lug 18 of the screw 17 and the termination of the cam surfaces 39 of the members E and F.

It will be readily observed that the machine of the present invention is one which automatically carries out the seaming operations and by rotation of the spindle C of the machine. This manner of operation makes is unnecessary for the operator to have to press the seaming rollers against the can top to make an effective air tight seal, and thus eliminates the human element in successful canning operations.

The fact that the machine is adapted to be operated by one hand of an operator means that an operator may can a large quantity of food products or other products with a minimum of fatigue thereby making canning with a machine of the present invention a pleasure rather than an arduous duty.

The invention has been described herein more or less precisely as to details, yet it is to be understood that the invention is not to be limited thereby, as changes may be made in the arrangement and proportions of parts and equivalents may be substituted, without departing from the spirit and scope of the invention.

The invention is claimed as follows:

1. A hand operated can sealing machine including a head, twin bars horizontally mounted in said head to reciprocate, cams on said bars, seaming rollers carried by said bars, a member vertically reciprocable between said bars and arranged to engage the cam of one bar during travel in one direction and to engage the cam of the other bar during travel in the opposite direction to apply the rollers carried by said bars alternately against a can and cover to seal the cover to the can, means for actuating said member, and spring means for moving said bars to initial position after either bar has been moved to its limit of travel by said member and said member has been shifted to engage the other bar.

2. In a hand operated can top sealing machine of the class wherein cans of different sizes are presented for sealing and wherein chucks of different sizes are used for sealing cans of different diameters, the combination of a driving spindle and a chuck plate and means for removably connecting the chuck plate to said spindle, said spindle having its lower end shaped to receive said chuck plate in relative non-rotative relation, said chuck plate being fashioned from sheet metal to provide a peripheral portion of axial dimension greater than the thickness of the sheet metal and a central dished portion with a central aperture fashioned to conform to the shape of said spindle end, a portion of the metal of the plate being inturned to provide a flange of greater axial extent than the thickness of the sheet metal and defining said aperture.

3. In a hand operated can top sealing machine of the class wherein cans of different sizes are presented for sealing and wherein chucks of different sizes are used for sealing cans of different diameters, the combination of a driving spindle and a chuck plate and means for removably connecting the chuck plate to said spindle, said spindle having its lower end shaped to receive said chuck plate in relative non-rotative relation, said chuck plate being fashioned from sheet metal to provide a peripheral portion of axial dimension greater than the thickness of the sheet metal and a central dished portion with a central aperture fashioned to conform to the shape of said spindle end, a portion of the metal of the plate being inturned to provide a flange of greater axial extent than the thickness of the sheet metal and defining said aperture, said spindle end having spring pressed means adapted to be retracted when a plate is applied to and removed from said end, said means snapping outwardly when a plate is applied to said end and said plate flange passes over said means to contact the flange margin and serve as a stop thereagainst to prevent accidental displacement of the plate.

4. In a can seaming machine of the class described, a supporting frame including an overhanging head, a spindle vertically supported in said head and removably carrying a driving chuck plate on its lower end, handle means for rotating said spindle, horizontally movable parallel bars supported in said head and lying on opposite sides of said spindle, the outer ends of said bars being bent downwardly at right-angles and carrying rollers at their extremities in cooperative alignment with said chuck plate, said spindle having a threaded portion, a nut on said threaded portion, said nut having an outstanding lug, cam members on the inner ends of said bars and adjustable therealong to vary the range of movement of said bars, the construction being such that on rotation of said spindle in one direction said nut lug engages the cam of one bar to move said bar and its roller inwardly into sealing relation with said chuck and on the reverse of rotative movement of said spindle to swing the nut to disengage its lug from the cam of said one bar and move it into engagement with the cam of the other bar to then move said other bar in like manner.

5. In a can seaming machine of the class described, a supporting frame including an overhanging head, a spindle vertically supported in said head and removably carrying a driving chuck plate on its lower end, handle means for rotating said spindle, horizontally movable parallel bars supported in said head and lying on opposite sides of said spindle, the outer ends of said bars being bent downwardly at right-angles and carrying rollers at their extremities in cooperative alignment with said chuck plate, said spindle having a threaded portion, a nut on said threaded portion, said nut having an outstanding lug, cam members on the inner ends of said bars and adjustable therealong to vary the range of movement of said bars, the construction being such that on rotation of said spindle in one direction said nut lug engages the cam of one bar to move said bar and its roller inwardly into sealing relation with said chuck and on reverse of rotative movement of said spindle to swing the nut to disengage its lug from the cam of said one bar and move it into engagement with the cam of the other bar to then move said other bar in like manner, and independently operative means for moving said bars outwardly away from said chuck plate when said lug has been moved away from a cam of either bar.

6. In a can seaming machine of the class described, a supporting frame including an overhanging head, a spindle vertically supported in said head and removably carrying a driving chuck plate on its lower end, handle means for rotating said spindle, horizontally movable parallel bars supported in said head and lying on opposite sides of said spindle, the outer ends of said bars being bent downwardly at right-angles and carrying rollers at their extremities in cooperative alignment with said chuck plate, said spindle having a threaded portion, a nut on said threaded portion, said nut having an outstanding lug, cam members on the inner ends of said bars and adjustable therealong to vary the range of movement of said bars, the construction being such that on rotation of said spindle in one direction said nut lug engages the came of one bar to move said bar and its roller inwardly into sealing relation with said chuck and on the reverse of rotative movement of said spindle to swing the nut to disengage its lug from the cam of said one bar and move it into engagement with the cam of the other bar to then move said other bar in like manner, and spring means for moving said bars outwardly away from said chuck when said lug has been moved away from a cam of either bar.

7. In a can seaming machine, a head, a pair of seaming rollers arranged to be guided by said head, a driving chuck, a vertically disposed spindle for rotating said chuck, a nut movable along said spindle and constituting driving means between said spindle and said rollers for alternately moving the rollers into seaming relation with said chuck, other means for moving said rollers away from said chuck, and means for independently varying the range of movement of said rollers.

8. In a can seaming machine, a frame including a head, a pair of seaming rollers arranged to be guided by said head, a spindle vertically supported in said head, a portion of said spindle being threaded, a chuck plate removably attached to the lower end of said spindle, horizontally reciprocable bars mounted in said head on each side of said spindle, the outer ends of said bars carrying rollers for performing seaming operations in cooperation with said chuck plate, the inner ends of said bars supporting cam members which are capable of adjustment along said bars, a nut movable along the threaded portion of said spindle and carrying a lug adapted to contact the cam member on one bar and move said bar inwardly when the spindle is rotated in one direction and adapted to contact the cam member on the other bar and move it inwardly when said spindle is rotated in the opposite direction, and means for operating said spindle.

9. In a can seaming machine, a frame including a head, a pair of seaming rollers arranged to be guided by said head, a spindle vertically supported in said head, a portion of said spindle being threaded, a chuck plate removably attached to the lower end of said spindle, horizontally reciprocable bars mounted in said head on each side of said spindle, the outer ends of said bars carrying rollers for performing seaming operations in cooperation with said chuck plate, the inner ends of said bars supporting cam members which are capable of adjustment along said bars, a nut movable along the threaded portion of said spindle and carrying a lug adapted to contact the cam member on one bar and move said bar inwardly when the spindle is rotated in one direction and adapted to contact the cam member on the other bar and move it inwardly when said spindle is rotated in the opposite direction, means for operating said spindle, and spring means to move said bars outwardly when said lug has been moved away from a cam member.

10. In a can seaming machine, a frame including a head, a pair of seaming rollers arranged to be guided by said head, a spindle vertically supported in said head, a portion of said spindle being threaded, a chuck plate removably attached to the lower end of said spindle, horizontally reciprocable bars mounted in said head on each side of said spindle, the outer ends of said bars carrying rollers for performing seaming operations in cooperation with said chuck plate, the inner ends of said bars supporting cam members which are capable of adjustment along said bars, a nut movable along the threaded portion of said spindle and carrying a lug adapted to contact the cam member on one bar and move said bar inwardly when the spindle is rotated in one direction and adapted to contact the cam member on the other bar and move it inwardly when said spindle is rotated in the opposite direction, means for operating said spindle, and means for adjustably positioning said cam members on said bars to vary the range of movement of said bars to accommodate said machine to cans of different diameters.

11. In a can seaming machine, a frame including a head, a pair of seaming rollers arranged to be guided by said head, a threaded spindle rotatably mounted in vertical position in said head, a driving chuck attached to the lower end of said spindle, an oscillatable member threaded on said spindle and movable therealong as the spindle is rotated adapted for alternately moving said rollers inwardly toward said chuck, and means for rotating said spindle.

12. In a can seaming machine, a frame including a head, a plurality of slidable bars guided in said head, rollers carried by said bars, cams on said bars, a threaded spindle vertically supported in said head, a driving chuck secured to the lower end of said spindle, a nut member threaded on said spindle movable along said spindle and having a projection arranged to alternately engage the cams to move first one roller against said chuck and then the second roller against said chuck, and spring means to move said rollers away from said chuck after said movable member has completed movement of the rollers toward the chuck.

13. In a can sealing machine of the class described, a frame including a head, a spindle vertically supported in said head, a chuck plate supported by said spindle, means for rotating said spindle, a seaming roll mechanism supported by spindle and guided in said head and including two horizontally reciprocable bars carrying seaming rollers at their outer ends, and a member movable vertically along said spindle by rotation thereof and operable by such movement for alternately moving said bars to bring their sealing rollers into cooperative sealing relation with respect to the chuck plate.

14. In a can sealing machine of the class described, a frame including a head, two independently movable and horizontally reciprocable bars carrying seaming rollers guided in and supported by said head, a chuck for driving a can during the seaming operation, a vertically disposed spindle for driving said chuck supported in said head, a member movable on and operable by rotation of said spindle for moving one of said bars to position its roller adjacent the chuck for the seaming operation and subsequently to move the other of said bars to position its roller adjacent the chuck for seaming operation, said member being disconnected from one bar while connected in moving relation with the other, means operative independently of the movement of said member for moving a bar and its roller away from seaming position, and means for rotating said spindle.

JOHN JUNKUNC.